(12) United States Patent
Wolf

(10) Patent No.: US 6,693,421 B2
(45) Date of Patent: Feb. 17, 2004

(54) POSITION SENSOR ASSEMBLY UTILIZING MAGNETIC FIELD VARIATIONS

(75) Inventor: Ronald J. Wolf, 51082 Stratford Ct., Elkhart, IN (US) 46514

(73) Assignee: Ronald J. Wolf, Elkhart, IN (US)

( * ) Notice: Subject to any disclaimer, the term of this patent is extended or adjusted under 35 U.S.C. 154(b) by 0 days.

(21) Appl. No.: 09/915,726

(22) Filed: Jul. 26, 2001

(65) Prior Publication Data

US 2003/0020465 A1 Jan. 30, 2003

(51) Int. Cl.$^7$ .............................. G01B 7/14; G01B 7/30; G01R 33/06; H01L 43/06
(52) U.S. Cl. ............................... 324/207.2; 324/207.25; 324/207.22
(58) Field of Search .................. 324/207.2, 207.21, 324/207.22, 207.25, 235, 251, 252; 338/32 H, 32 R

(56) References Cited

U.S. PATENT DOCUMENTS

| | | | |
|---|---|---|---|
| 4,086,533 A | * 4/1978 | Ricouard et al. | 324/207.2 |
| 4,970,463 A | 11/1990 | Wolf et al. | 324/207.2 |
| 5,332,965 A | 7/1994 | Wolf et al. | 324/207.12 |
| 5,497,081 A | 3/1996 | Wolf et al. | 324/207.12 |
| 5,789,917 A | * 8/1998 | Oudet et al. | 324/207.2 |
| 5,818,223 A | 10/1998 | Wolf | 324/207.12 |
| 6,087,827 A | 7/2000 | Oudet | 324/207.12 |

\* cited by examiner

Primary Examiner—Walter E. Snow
(74) Attorney, Agent, or Firm—Taylor & Aust, P.C.

(57) ABSTRACT

A sensor assembly senses one of position, velocity, acceleration or change of acceleration. The assembly includes at least one magnet having a north and south pole and a magnetic axis defined therebetween; a magnetic flux responsive device, the at least one magnet being fixedly adjacent to the magnetic flux responsive device; and a ferrous target selectively movable relative to the at least one magnet.

24 Claims, 6 Drawing Sheets

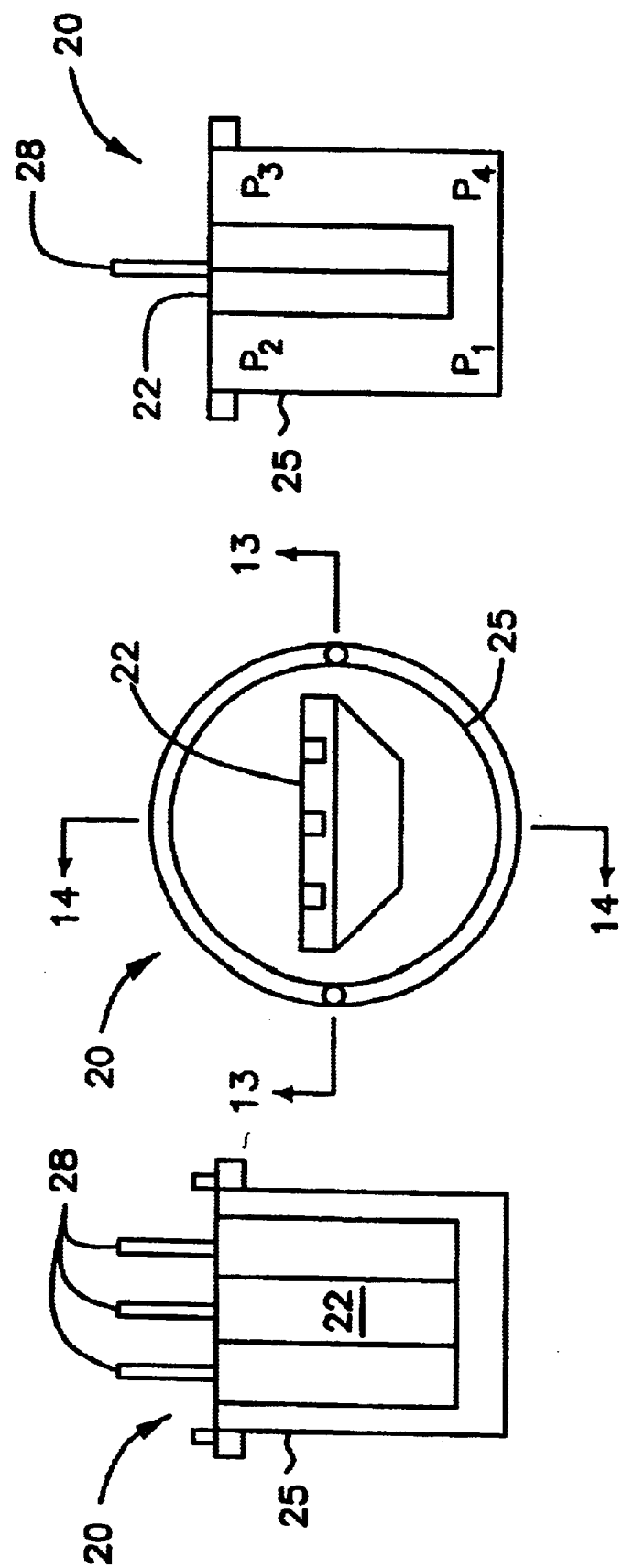

POSITION SENSOR ASSEMBLY UTILIZING MAGNETIC FIELD VARIATIONS

BACKGROUND OF THE INVENTION

1. Field of the Invention

The present invention relates to a sensor, and, more particularly, to a sensor assembly.

2. Description of the Related Art

Electronic devices are an increasing part of everyday life and they are presently integrated in a large number of products, including products traditionally thought of as mechanical in nature, such as automobiles. To bridge the gap between mechanical movement and electronic control it is necessary to successfully integrate electronic and mechanical components. The gap is normally bridged by using devices such as sensors and actuators.

Position sensors are used to electronically monitor the position or movement of a mechanical component. The position sensor produces data that may be expressed as an electrical signal that varies as the position of the mechanical component changes. Position sensors are an important part of innumerable products, providing the opportunity for intelligent control of a mechanical device.

Various contact type sensors are known. For example, potentiometers are used which detect a change in an electrical signal due to the physical change in position of a wiping contact on a resistive element. Rotational position movement can be detected by coupling a shaft of a potentiometer to the shaft of a rotating mechanical component. Linear movement can be detected using either a liner potentiometer or a rotating potentiometer that is coupled to a linear moving component using pulleys and a string or a belt to translate a linear motion to rotational motion. A problem with this type of sensor is the physical wearing of the rotating part, the wiping contact and the resistive element cause a drift in the electrical signal and lead to ultimate failure of the device.

Magnetic position sensors are generally a non-contact type of sensor and consist of a magnetic field sensing device which is usually stationary and a magnet attached to a moving component. As the magnet approaches the sensing device the magnetic field of the magnet is detected and the sensing device generates an electrical signal that is then used for counting, display, recording and/or control purposes. A problem with such sensors is that they depend on movement of the magnet and they are not able to provide information as to the static position of a mechanical component.

Other magnetic position sensors provide an indication of the displacement of the mechanical component by using a magnetic field sensing device which reports the intensity of a magnetic field from a magnet which is positioned on the mechanical component. The magnet is positioned and the magnetic field sensing device is located relative to the magnet in such a fashion as to cause the magnetic field to vary in the magnetic field sensing device as the magnet moves. A magnetic field sensing device may detect a static magnetic field from the magnet and report the field strength as a representation of the position of the mechanical component.

A magnetic positional sensor developed by the inventor, patented as U.S. Pat. No. 5,818,223, entitled "ROTARY POSITION SENSOR WITH CIRCULAR MAGNET", discloses a Hall effect device disposed within a cylindrically shaped magnet. The magnet having a magnetic field that varies from a north pole to a south pole as detected along a circular face of the magnet. The cylindrical magnet is mounted to a rotatable mechanical component and a Hall effect device is positioned inside the cylindrical magnet with an air gap therearound. The Hall effect device has flux concentrators mounted thereto. The magnetic field produced by the cylindrical magnet is detected by the Hall effect device which in response thereto produces an electrical response representative of the magnet and hence the mechanical component's angular position.

A problem with such sensors is that they require large magnets and many are particularly sensitive to air gap variations.

Another problem with rotating sensors is that they require a stationary and a movable portion within a single assembly.

What is needed in the art is a compact modular position sensor which will provide static and moving position information using smaller magnets.

SUMMARY OF THE INVENTION

The present invention provides a position sensor assembly with a magnetic flux responsive device, a magnetic source and a ferrous target which alters the magnetic field permeating the magnetic flux responsive device and thereby producing an electrical signal. The electrical signal is representative of the position of the ferrous target.

The invention comprises, in one form thereof, a sensor assembly for detection of changes in magnetic fields including a magnetic flux responsive device and at least one magnet fixedly adjacent to the magnetic flux responsive device.

In another form, the invention provides a sensor assembly for sensing position, velocity, acceleration or change of acceleration. The assembly includes at least one magnet, each magnet having a north and south pole and a magnetic axis defined therebetween; a magnetic flux responsive device, each magnet being fixedly adjacent to the magnetic flux responsive device; and a ferrous target selectively movable relative to the at least one magnet.

In yet another form, the invention provides a method for sensing position, velocity, acceleration or change of acceleration including the steps of positioning a magnetic flux responsive device fixedly adjacent to at least one magnet, the magnetic flux responsive device including at least one electrical output; moving a ferrous target relative to the magnetic flux responsive device, the ferrous target configured to alter the magnetic field in the magnetic flux responsive device when the ferrous target and the magnetic flux responsive device are moved relative to each other; and calculating position, velocity, acceleration and/or change of acceleration from an electrical signal provided via the electrical output of the magnetic flux responsive device.

In yet still another form, the invention provides a method for controlling position, velocity, acceleration and/or change of acceleration including the steps of positioning a magnetic flux responsive device fixedly adjacent to at least one magnet, the magnetic flux responsive device including at least one output, locating a ferrous target relative to the magnetic flux responsive device, the magnetic flux responsive device outputting sensor data on the at least one output based on a position of the ferrous target; mounting the ferrous target to a movable structure and the magnetic responsive device to an other structure, calculating position, velocity, acceleration and/or change of acceleration of the ferrous target using the sensor data and thereby providing calculated information; receiving operator input; producing a control signal using the calculated information and the operator input; and actuating a positioning apparatus based on the control signal, the positioning apparatus being connected to the movable structure.

An advantage of the present invention is that a modular cost effective sensor is provided.

Another advantage is that a mechanical device may have a ferrous target attached thereto and the sensor of the present invention may be separately positioned relative to the ferrous target.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5b is a side view of the position sensor assembly depicted in FIG. 5a;

FIG. 12 is a top view of another embodiment of a position sensor assembly of the present invention;

FIG. 13 is a sectional view of the position sensor assembly of FIG. 12 alone line 13—13; and FIG. 14 is a sectional view of the position sensor assembly of FIGS. 12 and 13 along line 14—14 of FIG. 12.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
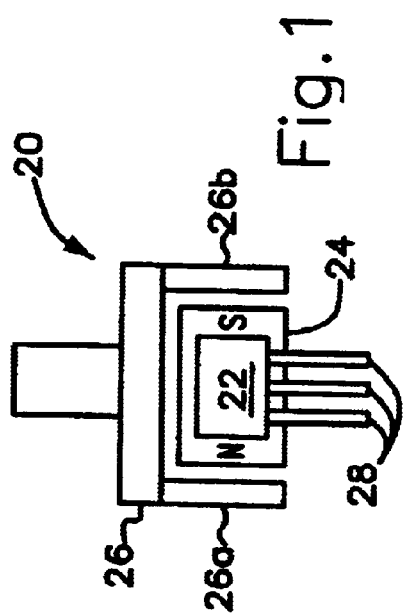
FIG. 1 is a sectional view of a position sensor assembly embodying the present invention.

Referring now to the drawings, and more particularly to FIG. 1, there is shown an embodiment of position sensor assembly 20 which generally includes magnetic flux responsive device 22, at least one magnet 24 and ferrous target 26.

Magnetic flux responsive device 22 is sensitive to changes in magnetic field strength and provides an electrical output utilizing a plurality of electrical leads 28. Magnetic flux responsive device 22 is substantially sensitive to the strength of a magnetic field in a sensing plane. The electrical output represents information relative to the strength of a magnetic field detected by magnetic flux responsive device 22. The electrical output may be analog or digital in nature and may be supplied on a continuous, periodic or an on demand basis. References to a magnetic flux responsive device 22 herein includes Hall effect devices, programmable Hall effect devices and other devices which sense magnetic field strength. References to a sensing plane are referring to that plane through which a change in magnetic field creates a response in magnetic flux responsive device 22. A sensing plane is contained within magnetic flux responsive device 22 and may be oriented in such a fashion as to optimize the desired output of magnetic flux responsive device 22.

Figure 4:
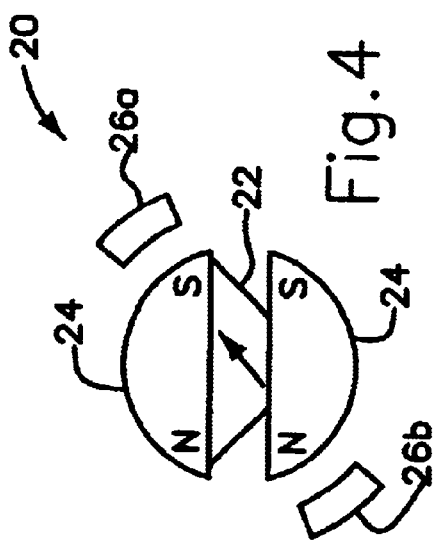
FIG. 4 is yet another sectional top view of the position sensor assembly of FIG. 1, illustrating another position of the ferrous target, and a magnetic field orientation within the position sensor assembly.
Figure 3:
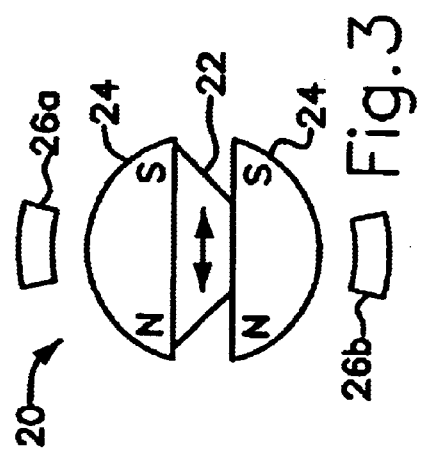
FIG. 3 is another sectional top view of the position sensor assembly of FIG. 1, illustrating another position of the ferrous target, and a magnetic field orientation within the position sensor assembly.
Figure 2:
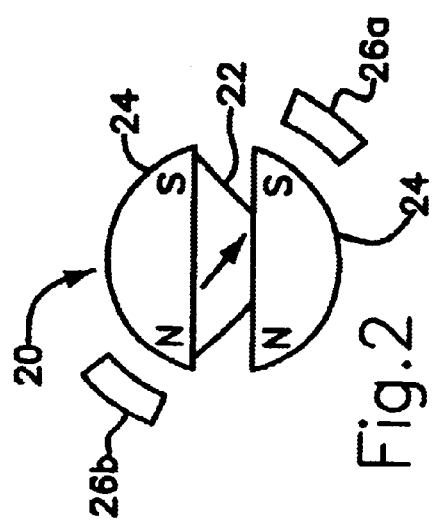
FIG. 2 is sectional top view of the position sensor assembly of FIG. 1, illustrating a position of the ferrous target, and a magnetic field orientation within the position sensor assembly.

Each magnet 24 includes a north pole N and a south pole S, with a magnetic axis defined as a line therebetween. Variations in magnetic material, geometry, composition, magnetic orientation and field strengths may be used and are within the scope of the present invention. Each magnet 24 is fixed adjacent to magnetic flux responsive device 22 with a magnetic axis of magnet 24 aligned substantially parallel with the sensing plane of magnetic flux responsive device 22 and if more than one magnet 24 is utilized (as illustrated in FIGS. 2–4) the north poles of each magnet 24 are generally oriented in the same direction. Positioning magnet 24 adjacent to magnetic flux responsive device 22 provides a magnetic bias to magnetic flux responsive device 22. Each magnet 24 may, for example, be attached to magnetic flux responsive device 22 with adhesive, or alternatively each magnet 24 may be injection molded together with magnetic flux responsive device 22 as an integral unit. Magnets 24 may include various materials such as samarium cobalt, neodymium or ceramic. The processing of magnetic materials may include processes of sintering, injection molding or transfer molding an epoxy binder. Magnet 24 may also include a magnetic cup 25, as shown in FIGS. 12–14, into which magnetic flux responsive device 22 is inserted.

Figure 7:
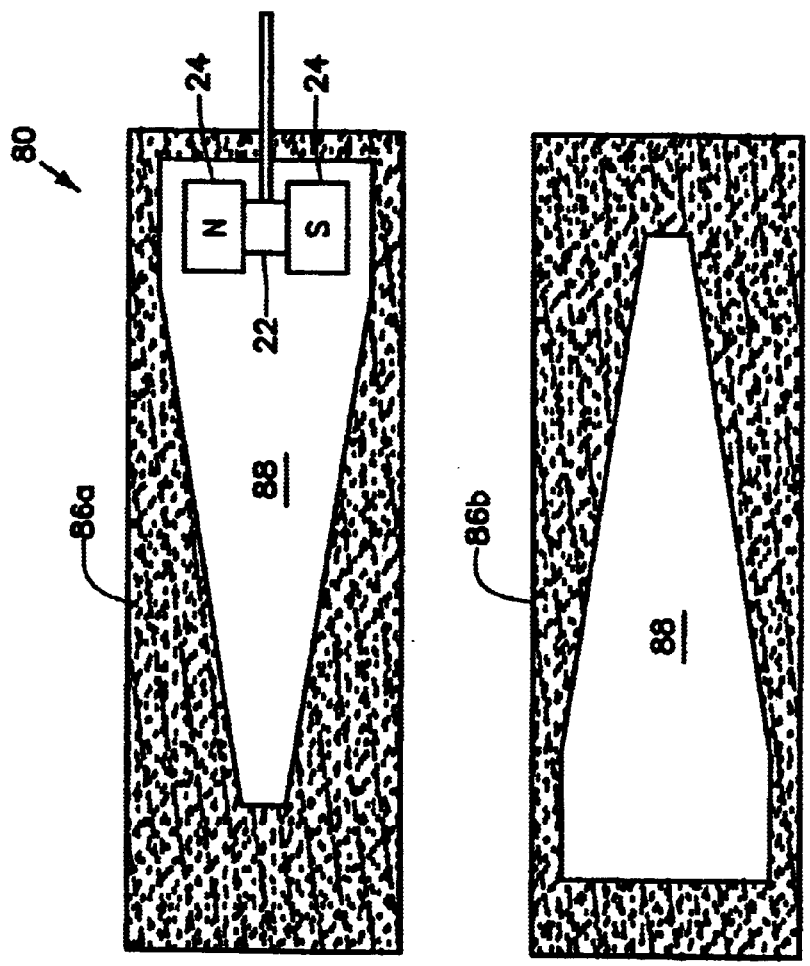
FIG. 7 is an unassembled view of an embodiment of the present invention for sensing linear position.
Figure 8:
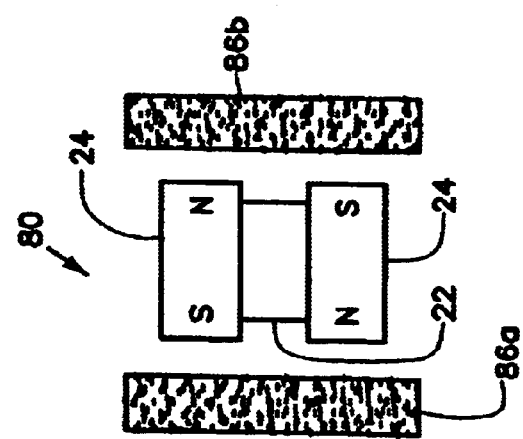
FIG. 8 is an end view of the assembled invention depicted in FIG. 7.

As can be seen in FIGS. 1–5, 7 and 8, magnetic flux responsive device 22 is positioned midway between the north pole N and the south pole S of a magnet 24. The curved shape of magnet 24 in FIGS. 1–5 is to accommodate the rotation of ferrous target 26 and magnets 24 may be otherwise shaped as shown in FIGS. 7 and 8. The positioning of magnetic flux responsive device 22 in a substantially centered position between the magnetic poles allows sensor assembly 20 to utilize lateral magnetic fields as they change direction as shown by the arrows in FIGS. 2–4.

Figure 6:
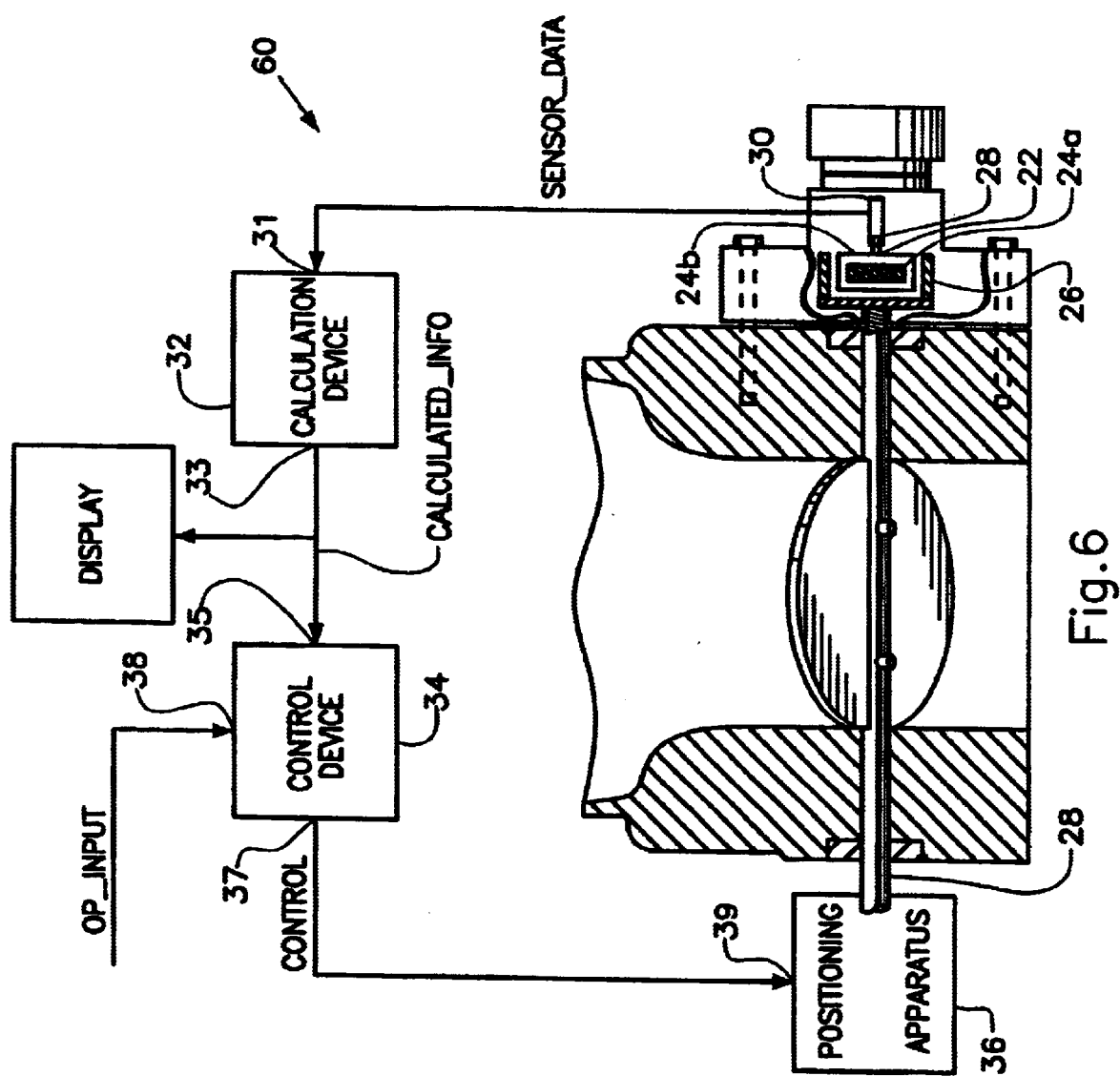
FIG. 6 is a sectional view of a rotating structure whose radial position is detected by a sensor device embodying the present invention and with block diagrams illustrating a control system embodying the present invention.

Ferrous target 26 is constructed of a material which directs and conducts magnetic flux. Variations in material, geometry, composition and ability to redirect magnetic flux may be used and are within the scope of the present invention. Two legs 26a and 26b protrude from ferrous target 26 for the purpose of redirecting magnetic flux through the sensing plane of magnetic flux responsive device 22. Ferrous target 26 is positioned to move relative to magnetic flux responsive device 22 and magnet 24, thereby altering the magnetic field strength within magnetic flux responsive device 22. Ferrous target 26 may be connected to a rotating apparatus in various manners, which those skilled in the art will recognize as an easy adaptation thereto. Ferrous target 26 may also be appended to or manufactured as part of an apparatus having a different function such as shown in FIG. 6. In such an instance magnetic flux responsive device 22 and magnet 24 may consist of a subassembly which may be positioned relative to ferrous target 26 later in an assembly process.

In normal operation ferrous target 26 is rotatable about magnetic flux responsive device 22 and magnet 24. Any variation in position of ferrous target 26 causes the magnetic field strength as detected by magnetic flux responsive device 22 to vary which corresponds with the physical orientation of ferrous target 26. The magnetic field strength permeating magnetic flux responsive device 22 is detected, processed and an electrical signal is output on electrical leads 28, the signal being representative of the radial of ferrous target 26. Those skilled in the art will recognize that the present invention may be easily adapted to provide positional information in a manner other than electrically, by utilizing the electrical signal to control some other physical attribute.

Figure 5B:
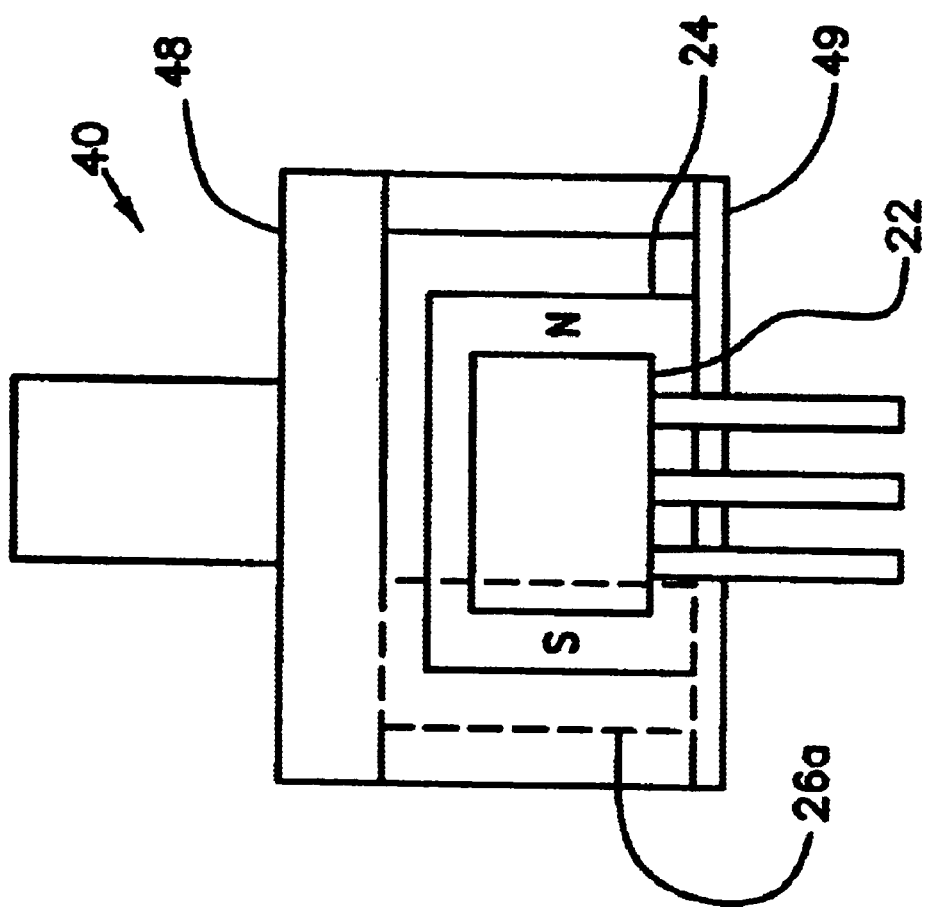
Figure 5A:
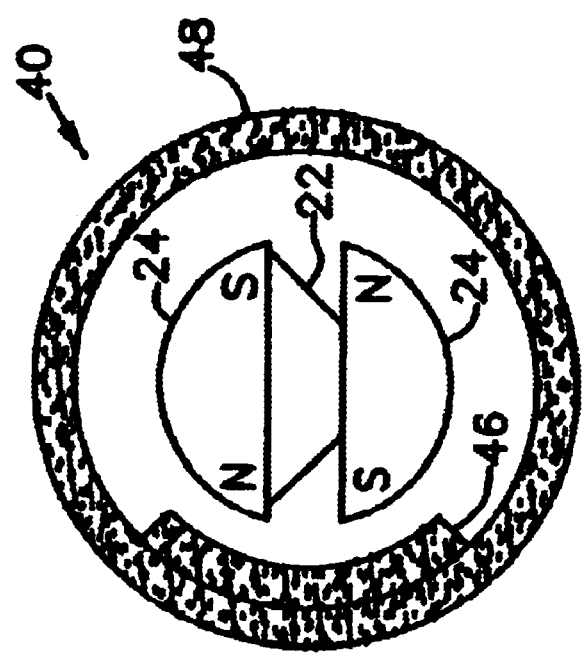
FIG. 5a is a sectional top view of another embodiment of the position sensor assembly of the present invention.

Referring now to FIGS. 5a and 5b, there is shown a position sensor illustrating another embodiment of the present invention.

In this embodiment of the present invention position sensor assembly 40 includes two or more magnets 24, magnetic flux responsive device 22, ferrous target 46 and target carrier 48. Magnets 24 are oriented with their north poles in opposing directions and substantially parallel to the sensing plane of magnetic flux responsive device 22. Ferrous target 46 differs from ferrous target 26 in that ferrous target 46 has only one leg. Target carrier 48 may be made of a material having a susceptibility different from that of ferrous target 46, where ferrous target 46 is either attached to target carrier 48 or contained therein. Alternatively, ferrous target 46 and target carrier 48 may be made of the same material with ferrous target being a protrusion on the inner portion of target carrier 48. If target carrier 48 is made of a ferrous material it will serve as a magnetic shunt or shield to external magnetic fields. A shunt or shield 49 may also be included to minimize the effects of magnetic fields from sources other than magnets 24.

Any of the embodiments herein may incorporate the attributes of target carrier 48 and shunt or shield 49.

Referring now to FIG. 6, there is shown a sectional and block diagram view of a position control system illustrating yet another embodiment of the present invention.

In this embodiment of the present invention position control system 60 includes magnetic flux responsive device 22, two magnets 24a and 24b, ferrous target 26, rotating structure 28, wiring harness 30, calculation device 32, control device 34 and positioning apparatus 36.

Magnetic flux responsive device 22 is as described in the foregoing embodiments.

Two magnets 24a and 24b are arranged as described in the first embodiment of the invention, with magnets 24a and 24b fixed adjacent to magnetic flux responsive device 22. The magnetic axis of magnet 24a and 24b being aligned substantially parallel with the sensing plane of magnetic flux responsive device 22 the north poles of magnets 24a and 24b being generally oriented in the same direction. Each magnet 24a and 24b, for example, may be attached to magnetic flux responsive device 22 with adhesive, or alternatively each magnet 24a and 24b may be injection molded together with magnetic flux responsive device 22 as an integral unit.

Ferrous target 26 is as described in the first embodiment of the invention, and is here attached to rotating structure 28.

Rotating structure 28 may be any rotatable structure for which positional control is desired. In FIG. 6 rotating structure 28 is illustrated as a rotatable butterfly valve.

Wiring harness 30 provides electrical interconnection between magnetic flux responsive device 22 and calculation device 32.

Calculation device 32 includes sensor data input 31 and calculated information output 33. Sensor data input 31 is coupled with leads 28 of magnetic flux responsive device output 22, for receiving sensor data signal SENSOR_DATA, which may be analog or digital in nature. Calculation device 32 may also include either an internal clock or be connected to an external clock signal. Calculation device 32 processes sensor data signal SENSOR_DATA and time from a clock to generate calculated information signal CALCULATED_INFO that is in turn provided to calculated information output 33. Calculated information signal CALCULATED_INFO includes data relative to at least one of position, velocity, acceleration and change in acceleration which relates to the position and motion status of rotating structure 28.

Those skilled in the art will recognize the ease of which calculated information signal CALCULATED_INFO may be processed and utilized for the purposes of at least display and/or feedback control.

Control device 34 includes calculated information input 35, operator signal input 38 and control signal output 37. Calculated information input 35 is coupled to calculated information output 33 for receiving calculated information signal CALCULATED_INFO. An operator signal OP_INPUT is sent by an operator to alter the position of rotating structure 28. Operator signal input 38 is provided to connect to an operator controlled device (not shown), which may be implemented as an output of an embodiment of the present invention, to receive operator signal OP_INPUT. Control device 34 processes CALCULATED_INFO and OP_INPUT to generate a control signal CONTROL that is in turn provided to control signal output 37.

Positioning apparatus 36 is coupled to rotating structure 28 and includes a control signal input 39 which is coupled to control signal output 37 for receiving control signal CONTROL. Positioning apparatus 36 responds to control signal CONTROL and causes rotating structure 28 to rotate.

Combinations of the structure of this embodiment may be combined and such combination is within the scope of this invention.

Referring now to FIGS. 7 and 8 there is illustrated yet another embodiment of the present invention for the sensing of linear position. Position sensor assembly 80 includes two or more magnets 24, magnetic flux responsive device 22, and ferrous targets 86a and 86b. Magnets 24 are oriented with their north poles in opposing directions and parallel to the sensing plane of magnetic flux responsive device 22. In normal operation ferrous targets 86a and 86b are movable relative to magnetic flux responsive device 22 and magnets 24. Any variation in position of ferrous targets 86a and 86b causes the magnetic field strength as detected by magnetic flux responsive device 22 to vary which corresponds with the physical configuration and orientation of ferrous target 86a and 86b. The magnetic field strength permeating magnetic flux responsive device 22 is detected, processed and an electrical signal is output on electrical leads 28, the signal being representative of the linear position of ferrous target 26. The electrical and magnetic operation of magnetic flux responsive device 22 and magnets 24 of this embodiment of the invention functions in a similar manner as those previously described.

Ferrous targets 86a and 86b are shown separated in FIG. 7 to illustrate the geometrical shape of cutouts 88 therein. In operation ferrous targets 86*a* and 86*b* are fixed relative to each other and are substantially parallel as shown in FIG. 8. Cutouts 88 in ferrous targets 86*a* and 86*b* may be of any shape. The shape of cutouts 88 may be selected to facilitate a desired electrical response from magnetic flux responsive device 22. Alternatively, ferrous targets 86*a* and 86*b* may themselves be shaped with a profile which will vary the magnetic flux in magnetic flux responsive device 22 and hence the electrical response therefrom, with or without cutouts 88.

Figure 9:
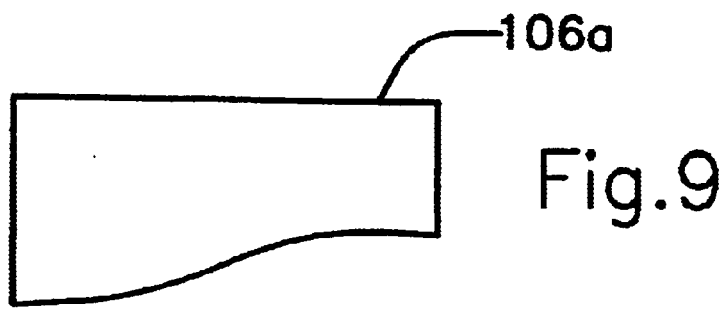
FIG. 9 is an illustrative profile of a cylindrical ferrous target of an embodiment of the present invention.
Figure 10:
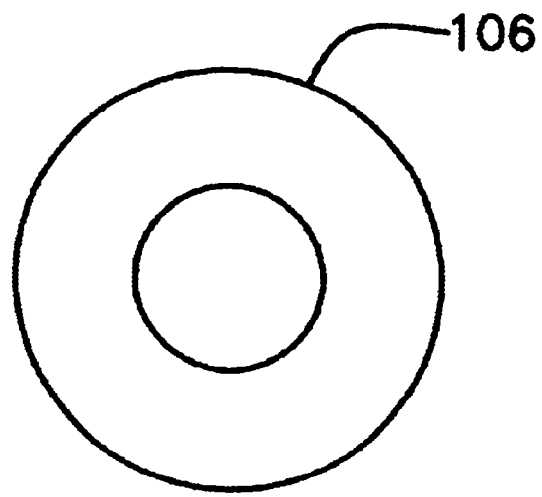
FIG. 10 is a top view of a cylindrical ferrous target depicted in FIG. 9.
Figure 11:
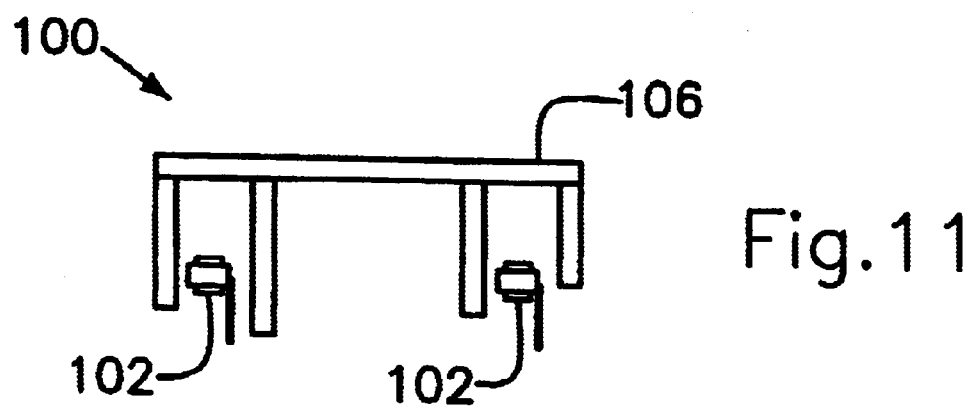
FIG. 11 is a sectional view of a position sensor utilizing the ferrous target depicted in FIG. 10.

Referring now to FIGS. 9, 10 and 11 there is illustrated yet another embodiment of the present invention for the sensing of radial position. Position sensor assembly 100 includes at least one biased magnetic flux responsive device 102 and a profiled ferrous target 106.

Biased magnetic flux responsive device 102 includes a magnetic flux responsive device 22 and two magnets 24 which may be oriented with their north poles in substantially the same direction or substantially in opposite directions and parallel to the sensing plane of magnetic flux responsive device 22. The orientation of magnets 24 may be altered to provide the desired electrical response from magnetic flux responsive devices 22. The electrical and magnetic operation of the combined magnetic flux responsive device 22 and magnets 24, which is hereby referred to as biased magnetic flux responsive device 102 of this embodiment of the invention, functions in substantially the same manner as those previously described.

Profiled ferrous target 106 includes at least one profiled ferrous cylindrical surface 106*a* an illustrative profile of which is shown in FIG. 9. Profiled ferrous target 106 may in addition or alternatively have cutouts as in the previous embodiment of this invention. Profiled ferrous target 106 is coaxially attached to or manufactured as a part of a rotating structure (not shown).

Position sensor assembly 100 may use calculation, display and control devices, as disclosed herein, to obtain sensor information from the at least one biased magnetic flux responsive device 102 and thereby provide position, velocity, acceleration and/or change of acceleration information to another system, for display or control of a rotatable structure.

Additionally, multiple biased magnetic flux responsive devices 102 may be positioned in a predetermined geometric pattern relative to a continuously rotating ferrous target 106 and may be integrated with calculation, display and control devices, as disclosed herein, to obtain sensor information from the at least one biased magnetic flux responsive device 102 and thereby provide position, velocity, acceleration and/or change of acceleration information to another system, for display or control of a rotatable structure.

Alternatively, multiple magnetic flux responsive devices 22 may be arranged with at least one magnet 24 in a single assembly.

Now, additionally referring to FIGS. 12–14, there is shown position sensor assembly 20 with magnetic responsive device 22 inserted into magnetic cup 25. Magnetic cup 25 has at least two magnetic poles shown as $P_1$–$P_4$. Magnetic North and South poles are located at generally opposite points, but may be located at any position in magnetic cup 25. Magnetic cup 25 substantially surrounds magnetic responsive device 22. Magnetic cup 25 has a cavity that is shaped to accommodate, and to be substantially filled by, magnetic responsive device 22. Magnetic responsive device 22 may be secured to magnetic cup 25 with an adhesive.

In the manufacture of the position sensors described herein, repeatable accuracy between units may be maintained by several techniques such as magnet positioning, abrading of the magnets and/or programming steps of a programmable magnetic flux responsive device, which anyone skilled in the art may easily adapt to a particular configuration of the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sensor assembly for detection of changes in magnetic fields, comprising:

a magnetic flux responsive device; and at least two magnets having a north pole at one end and a south pole at an opposite end, said magnetic flux responsive device substantially centered between said north pole and said south pole along a side of each said magnet;

wherein each said magnet has a magnetic axis defined as a north pole at one end of said magnet axis and a south pole at an opposite end of said magnetic axis, said magnetic responsive device having a sensing plane wherein said magnetic flux responsive device is responsive to magnetic flux, each said magnet being configured to provide a magnetic field bias to said magnetic flux responsive device, at least one said magnet being located on each side of said magnetic flux responsive device with each said magnetic axis being substantially coplanar with said sensing plane, and said north poles of said at least two magnets being oriented in opposite directions relative to each other.

2. A sensor assembly for detection of changes in magnetic fields, comprising:

a magnetic flux responsive device; and at least two magnets having a north pole at one end and a south pole at an opposite end, said magnetic flux responsive device substantially centered between said north pole and said south pole along a side of said magnet, wherein each said magnet has a magnetic axis defined as a north pole at one end of said magnet axis and a south pole at an opposite end of said magnetic axis, said magnetic responsive device having a sensing plane wherein said magnetic flux responsive device is responsive to magnetic flux, each said magnet being configured to provide a magnetic field bias to said magnetic flux responsive device, at least one said magnet being located on each side of said magnetic flux responsive device with each said magnetic axis being substantially coplanar with said sensing plane, and said north poles of said at least two magnets being oriented in the same direction relative to each other.

3. A sensor assembly for sensing one of position, velocity, acceleration and change of acceleration comprising:

at least one magnetic cup having at least one north and at least one south pole; a magnetic flux responsive device, positioned substantially within said at least one magnetic cup; and a ferrous target selectively movable relative to said at least one magnetic cup, said magnetic flux responsive device positioned coaxially with said ferrous target, said ferrous target in continuous magnetic field altering communication with said magnetic flux responsive device.

4. The sensor assembly of claim 3, wherein said magnetic flux responsive device is at least one of a Hall effect device and a programmable Hall effect device.

5. The sensor assembly of claim 3, wherein said magnetic flux responsive device is a Hall effect device with at least one magnet fixed adjacent thereto.

6. A sensor assembly for sensing one of position, velocity, acceleration and change of acceleration, comprising:
at least one magnet, each said magnet having a north and south pole and a magnetic axis defined between said north and south pole;
at least two magnetic flux responsive devices, said at least one magnet being fixedly adjacent to at least one said magnetic flux responsive device; and
at least one ferrous target selectively movable relative to said at least one magnet, at least one said magnetic flux responsive device positioned, substantially coaxially with said ferrous target, said ferrous target in continuous magnetic field altering communication with said magnetic flux responsive device.

7. A sensor assembly for sensing one of position, velocity, acceleration and change of acceleration, comprising:
at least two magnets each having a north and south pole and a magnetic axis defined between said north and south pole;
a magnetic flux responsive device, at least two of said magnets being fixed adjacent to said magnetic flux responsive device; and
a ferrous target selectively movable relative to said at least two magnets, said magnetic flux responsive device positioned substantially coaxially with said ferrous target, said ferrous target in continuous magnetic field altering communication with said magnetic flux responsive device.

8. The sensor assembly of claim 7, wherein said magnetic flux responsive device is responsive to magnetic flux in a plane, at least one of said at least two magnets being located on each side of said magnetic flux responsive device with each said magnetic axis substantially coplanar with said plane and said north poles of said at least two magnets being oriented in substantially the same direction.

9. The sensor assembly of claim 8, wherein said ferrous target has two legs, said ferrous target configured to rotate about said magnetic flux responsive device.

10. The sensor assembly of claim 7, wherein said magnetic flux responsive device is responsive to magnetic flux in a plane, at least one of said at least two magnets being located on each side of said magnetic flux responsive device with each said magnetic axis substantially coplanar with said plane and said north poles of said at least two magnets being oriented in substantially opposite directions.

11. The sensor assembly of claim 10, wherein said ferrous target has one leg, said ferrous target configured to rotate about said magnetic flux responsive device.

12. The sensor assembly of claim 8, wherein said ferrous target is configured with a geometrical shape, said ferrous target and said magnetic flux responsive device being configured to move relative to each other.

13. The sensor assembly of claim 10, wherein said ferrous target is configured with a geometrical shape, said ferrous target and said magnetic flux responsive device being configured to move relative to each other.

14. The sensor assembly of claim 7, wherein said ferrous target is two parallel ferrous plates with a geometric pattern removed therefrom, said magnetic flux responsive device being located between said two parallel ferrous plates.

15. The sensor assembly of claim 7, wherein said ferrous target is two concentric ferrous plates with a geometrical pattern removed therefrom, said magnetic flux responsive device being located between said two concentric ferrous plates.

16. The sensor assembly of claim 7, further comprising a calculation device, said magnetic flux responsive device being configured with electrical connections, said calculation device being electrically connected to said magnetic flux responsive device and configured to calculate at least one of position, velocity, acceleration, and change of acceleration of said ferrous target and said magnetic flux responsive device relative to each other.

17. The sensor assembly of claim 16, wherein said magnetic flux responsive device is at least one of a Hall effect device and a programmable Hall effect device.

18. The sensor assembly of claim 16, further comprising at least one additional magnetic flux responsive device electrically connected to said calculation device.

19. The sensor assembly of claim 18, further comprising at least one additional ferrous target.

20. A method for sensing one of position, velocity, acceleration and change of acceleration, comprising the steps of:
geometrically positioning at least two biased magnetic flux responsive devices wherein a biased magnetic flux responsive device comprises at least one magnet fixedly adjacent to a magnetic flux responsive device, said magnetic flux responsive device including at least one electrical output;
moving a ferrous target relative to each said biased magnetic flux responsive device, said ferrous target having a continuous profiled projection, configured to continuously alter the magnetic field in each said biased magnetic flux responsive device;
outputting electrical signals from each said biased magnetic flux responsive device; and calculating at least one of position, velocity, acceleration and change of acceleration from said electrical signals.

21. The method of claim 20, further comprising the steps of:
mounting each said biased magnetic flux responsive device on a supporting structure;
mounting said ferrous target on a movable supporting structure; and
moving said ferrous target relative to each said biased magnetic flux responsive device.

22. The method of claim 21, further comprising the step of displaying said at least one of position, velocity, acceleration and change of acceleration determined in said calculating step.

23. The method of claim 21, further comprising the step of controlling at least one of position, velocity, acceleration and change of acceleration of said movable supporting structure.

24. A method for controlling at least one of position, velocity, acceleration and change of acceleration comprising the steps of:
positioning a magnetic flux responsive device fixedly adjacent to at least one magnet, said magnetic flux responsive device including at least one output;
locating a ferrous target relative to said magnetic flux responsive device;
outputting sensor data on said at least one output of said magnetic flux responsive device based on a position of said ferrous target;

mounting said ferrous target to a movable structure and said magnetic responsive device to an other structure;

calculating at least one of position, velocity, acceleration and change of acceleration of said ferrous target using said sensor data and thereby providing calculated information; receiving operator input;

producing a control signal using said calculated information and said operator input; and actuating a positioning apparatus based on said control signal, said positioning apparatus being connected to said movable structure.

* * * * *